Figure 1:
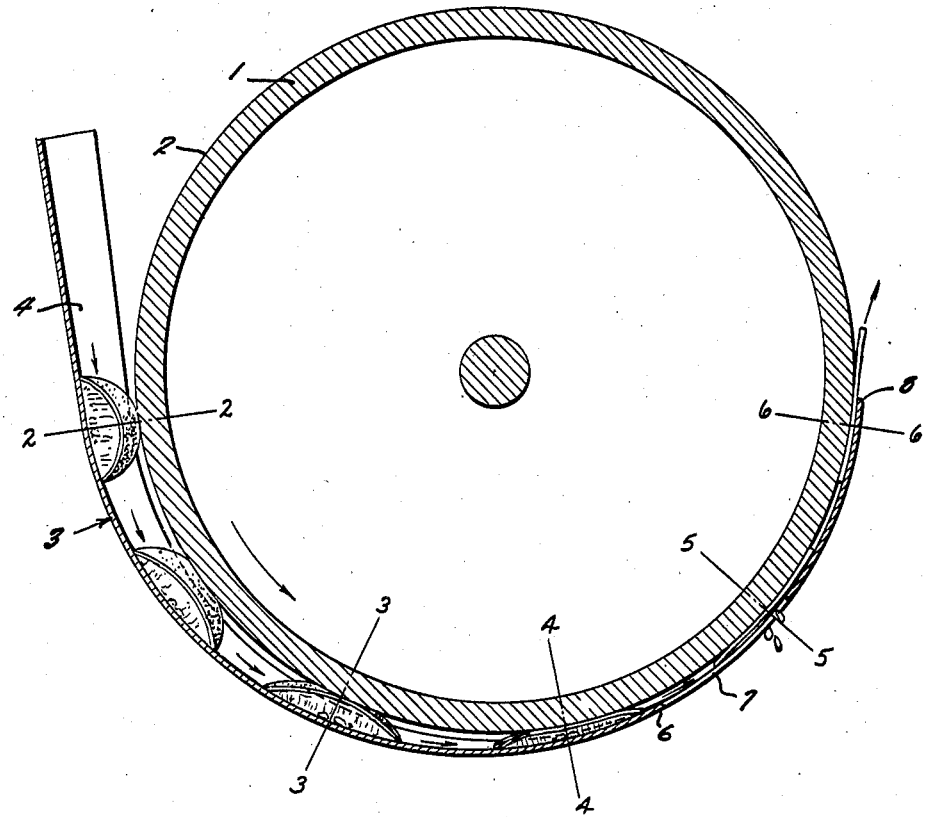

Nov. 23, 1943.  R. B. McKINNIS  2,334,783
PROCESS FOR EXTRACTING OIL FREE JUICES
Filed May 1, 1940

Inventor
RONALD B. McKINNIS

By Semmes, Keegin & Semmes
Attorneys

Patented Nov. 23, 1943

2,334,783

UNITED STATES PATENT OFFICE 2,334,783

PROCESS FOR EXTRACTING OIL FREE JUICES

Ronald B. McKinnis, Winter Haven, Fla., assignor, by mesne assignments, to Ronald B. McKinnis, doing business as McKinnis Foods, Winter Haven, Fla.

Application May 1, 1940, Serial No. 332,809

5 Claims. (Cl. 100—47)

My invention relates to the extraction of juice from fruits and vegetables, and is particularly of use in extraction of juice from citrus fruits, though it is not exclusively of use in connection with fruit of this type.

An objectionable taste often found in canned orange and grapefruit juices is due to peel oil contamination of the juice.

In present extracting machinery, the fruit peel is considerably torn and abraded, rupturing the oil sacs in the skin. Burring the juice from halved fruit eliminates rupturing the oil sacs to some extent, but care must be taken in handling and grading the fruit to prevent skin mutilation in the burring operation. Then again, burring does not lend itself to rapid extraction necessary to modern production methods.

An object of the invention is to extract juice from fruits and vegetables in such a manner that gentle pressing takes place without grinding or removal of core, membranes, or any part of the peel.

A further object is to extract quarters of the fruit, or other segments less than a half, for it has been found that some halves do not extract well, particularly where the halves are cut lengthwise of fruit; that is to say, along a line approximately coinciding with the pithy core.

Another object is to extract juice free from peel oil.

Yet other objects are to provide a system that does not need a timing mechanism, and which will handle various sizes of fruit.

While the method shown is one modification of the system which I may employ, it is to be understood that many other modifications will fall within the spirit of this invention, and other objects will be apparent from the ensuing description.

It has been found that by cutting the fruit into quarters, and then gradually bending the skin outwardly to flatten the quarters, the juice may be removed from the fruit without being contaminated by peel oil from ruptured cells.

The above process may be put into practical effect by passing the individual quarters of fruit between two surfaces which form a gradually constricting passage throughout their length. The input end of this passage is virtually triangular in shape, i. e., the shape of a lateral section of a quarter of the fruit. As the passage progresses, the trough formed by the trough-shaped surface gradually flattens so that that surface parallels to the flat surface against which the peel contacts, and is spaced from it approximately the thickness of the fruit peel.

As the fruit quarters progress through this passage, their shape is gradually flattened and juice is squeezed from them by pressure of the two converging surfaces. At a point in the passage intermediate the ends, where the distance between the surfaces is about equal to the thickness of the skin plus the thickness of seed, one of the surfaces may be perforated to form a grid through which the seed may be expelled, thus allowing the remaining juice to be pressed out.

All sizes of fruit may be handled indiscriminately by the above process, thereby eliminating the grading of the fruit and the multiplication of the extractors. Neither is there the necessity of timed operation required in ordinary automatic juice extraction, another great advantage in increasing output.

Figure 2:
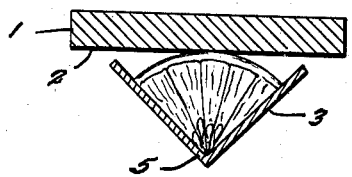
Figure 3:
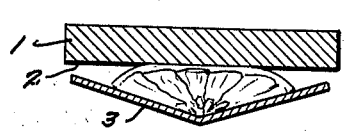
Figure 4:
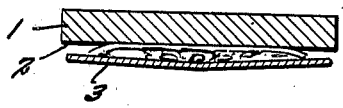
Figure 5:
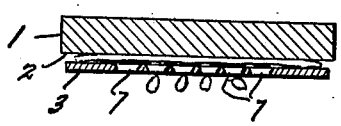
Figure 6:
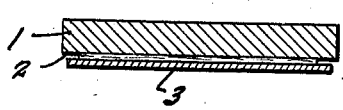

Fig. 1 is a diagrammatic sectional view taken through an expressing mechanism to illustrate the method;

Fig. 2 is a view taken along line 2—2 of Fig. 2;
Fig. 3 is a view taken along line 3—3 of Fig. 2;
Fig. 4 is a view taken along line 4—4 of Fig. 2;
Fig. 5 is a view taken along line 5—5 of Fig. 2;
Fig. 6 is a view taken along line 6—6 of Fig. 2.

Figures 2 to 7 may be referred to, to diagrammatically illustrate one method of carrying out this process. The numeral 1 designates a rotating drum of relatively large diameter. The cylindrical surface 2 of this drum represents a plane pressure surface and is adapted to contact the skin of the fruit quarters. Adjacent the surface 2 is an arcuate plate 3 which gradually spirals toward the drum. The lateral shape of the plate 3, at its input end 4, forms approximately a right angle, as indicated at 5. From the end 4 this angle gradually increases throughout the length of the plate until it attains 180° at 6. Here the space between the plate 3 and the drum 1 is slightly greater than the maximum thickness of skin plus seed which may be encountered. Elongated slots 7 are formed in the plate 3 at this point. The plate 3 continues its spiral approach to the drum 1 to the end 8, where it is spaced from the drum by approximately the skin thickness.

Quarters of fruit are fed into the passage between the drum and plate at the triangular end 4, where the periphery of the moving drum makes a frictional contact with the skin and carries the fruit with it. As the angle of the plate 3 increases so that its apex approaches the drum the skin is gradually flattened and the juice expelled from the fruit.

When the fruit reaches the grid formed by slots 7, the seeds are expelled through the slots and the remaining juice pressed out. Peels are discharged over the end 8 of the plate 3, and the expressed juice may be further processed, such as strained, pasteurized and canned.

Though I have shown the oranges as quartered, it is to be understood that pieces of less or greater size than a quarter of an orange or grapefruit may be used. Though the surface against which the juice sacs rest at the start of the pressing operation is indicated as a surface formed by two smooth surfaces at right angles to each other, it is to be understood that it is not necessary to have this angularity exact. Particularly is this true where pieces of fruit of, for instance, smaller sizes than quarters are used in the operation.

Some of the main features of the operation are that the fruit shall be cut in sizes such that when the pieces are gradually flattened out there will be but slight opportunity for the peel oil to be expressed in quantities such as to substantially contaminate the juice. This can be clarified by saying that the peel must not be bent sufficiently to rupture many oil sacs in the peel. To minimize the rupturing of oil sacs in the peel, two factors should be kept in mind:—first, the peel must be flattened gradually; second, the piece of peel attached to each segment of fruit must be sufficiently small so that it will not need to be stressed greatly to flatten it.

It is to be noted that the rupture of the juice sacs against the angularly disposed surfaces lubricates the movement of the segments over such angularly disposed surfaces. There is also a strong tendency for the peel side of the fruit to adhere to the rotating or moving member, which causes the segment to move over the squeezing surface. Rupture of the juice sacs thus acts as a true lubricant to facilitate the movement of the segments during the expressing operation.

I claim:

1. A method of extracting the juice from citrus fruit comprising cutting whole fruit into quarter sections, moving the fruit sections between a movable surface and a stationary surface which gradually converges toward the movable surface with the peel surface of the fruit engaging the movable surface, and supporting the cut surfaces of the fruit sections by the stationary surface while maintaining substantially the entire cut surfaces of the sections in sliding engagement with the stationary surface to permit a free straightening movement of the peel whereby the peel is substantially straightened while the pulp portion of each section is gradually substantially flattened against the peel portion thereof to extract juice from the fruit sections.

2. A method of extracting the juice from citrus fruit comprising cutting whole fruit into quarter sections, moving the fruit sections through a gradually converging passageway, continuously supporting by substantially complete contact the entire area of the cut surfaces of the fruit sections for free peel straightening movement during the passage of the fruit sections through the passageway whereby the peel is straightened while the pulp portion of each section is gradually substantially flattened against the peel portion thereof to express juice from the fruit sections.

3. A method of extracting the juice from citrus fruit comprising cutting whole fruit into quarter sections, moving the fruit sections between a movable surface and a stationary surface which gradually converges toward the movable surface with the peel surface of the sections in frictional contact with the movable surface and substantially the entire cut surfaces of the sections in sliding engagement with the stationary surface thereby to gradually substantially straighten the peel and to substantially flatten the pulp portion of each section against the peel portion thereof to express juice from the fruit sections.

4. A method of extracting the juice from citrus fruits comprising cutting the whole fruit into quarter sections, moving the fruit sections over a supporting surface while maintaining substantially the entire cut surfaces of the sections in sliding engagement with the said supporting surface, and exerting a gradually increasing pressure normal to the peel surface of the sections simultaneously with movement of said sections, whereby the peel is substantially straightened and the pulp portion of each section is gradually substantially flattened against the peel portion thereof to extract juice from the fruit sections.

5. A method of extracting the juice from citrus fruits comprising cutting the whole fruit into wedge shaped sections, moving the fruit sections lengthwise over a supporting surface while maintaining substantially the entire cut surfaces of the sections in sliding engagement with the said supporting surface, and exerting a gradually increasing pressure normal to the peel surface of the sections simultaneously with movement of said sections, whereby the peel is substantially straightened and the pulp portion of each section is gradually substantially flattened against the peel portion thereof to extract juice from the fruit sections.

RONALD B. McKINNIS.